Sept. 6, 1927.

G. B. QUATMAN 1,641,455

WAFFLE IRON

Filed June 29, 1926

INVENTOR,
George B. Quatman
BY Howard P. Smith
ATTORNEY.

Patented Sept. 6, 1927.

1,641,455

UNITED STATES PATENT OFFICE.

GEORGE B. QUATMAN, OF SIDNEY, OHIO.

WAFFLE IRON.

Application filed June 29, 1926. Serial No. 119,316.

This invention relates to new and useful improvements in waffle irons.

It is the principal object of my invention to provide for waffle irons, and chiefly those of the electric type, an apertured plate insertible between the iron and the lid to support the waffle while it is being baked and later to raise it above the impression elements or projections on the bottom of the iron so that it may be removed intact.

At present, after the waffle is baked, it is necessary to insert a knife below the plane of the tops of the impression elements on the bottom of the iron to get under the waffle, which results in the waffle being broken during its removal from the iron. My device, which practically comprises an apertured metal disc upon which the waffle rests, is elevated by the lid to raise the waffle above the plane of the tops of the impression elements on the bottom of the iron so that a knife can be inserted below the waffle when it is above these elements to remove it intact.

Figure 1:
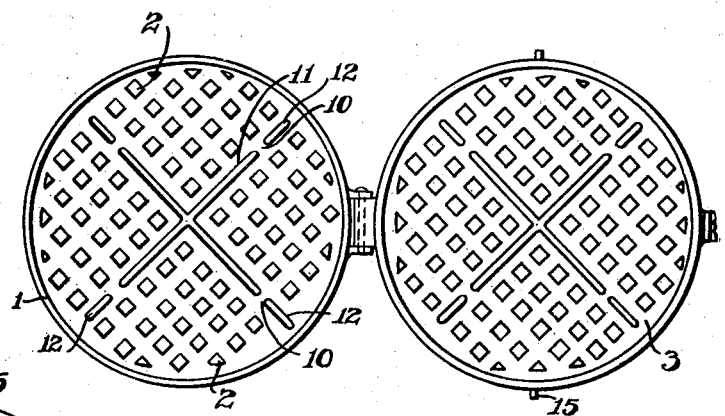
Figure 2:
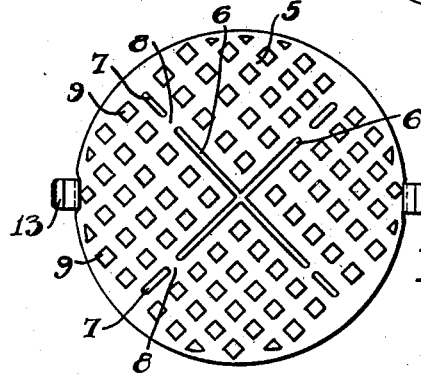
Figure 5:
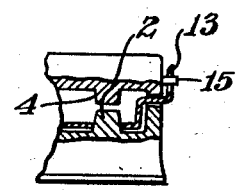
Figure 3:
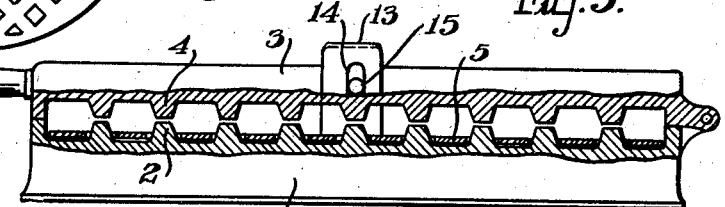
Figure 4:
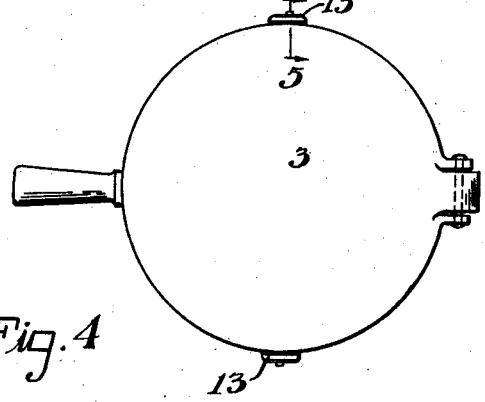

In the accompanying drawings illustrating my invention, Figure 1 is a top plan view of the waffle iron in its open condition. Figure 2 is a top plan view of the apertured metal disc which fits over the impression elements on the bottom of the iron to support the waffle while it is being baked. Figure 3 is a longitudinal sectional view taken through the waffle iron, showing the apertured metal disc in place therein. Figure 4 is a top plan view of the waffle iron in its closed condition. And Figure 5 is a sectional view taken on the line 5—5 of Figure 4, showing the slotted hook and pin means for connecting the apertured metal disc to the lid.

Referring to the accompanying drawings for a detailed description of my invention, the numeral 1 designates the bottom part of a conventional electric waffle iron and having formed on its inner bottom surface a plurality of impression elements or projections 2. Hingedly secured to the bottom grid or iron 1 at one end thereof is a lid 3 that is formed on its top inner surface with impression elements or projections 4 that are opposite the elements 2 when the waffle iron is closed, as shown in Figure 3.

For the purpose of assisting in the removal of a waffle without breaking it after it has been baked in the waffle iron, I have provided the following means. Referring to Figure 2, the numeral 5 designates a disc, preferably constructed of aluminum, which is formed with central radial slots 6 and outer alined slots 7. Between each central slot 6 and its respective outer alined slot 7 there is left a web 8. The disc is also formed with square holes 9 of slightly larger area than that of the impression elements 2 and corresponding in number to them.

The disc 5 as above constructed is adapted to fit upon the iron 1, with the impression elements 2 projecting through the holes 9 in the disc and the webs 8 on the latter fitting in the spaces 10 between the cross webs 11 and 12 on the iron. Upon this disc 5 the batter is placed, after which the lid 3 is closed down upon it.

For the purpose of raising the disc 5 a sufficient distance to elevate the baked waffle above the tops of the impression elements 2 of the iron 1, so that it may be easily removed intact, I have provided the following means for connecting the disc to the lid 3. Referring to Figures 2, 3, 4 and 5, there are formed upon, or secured to, the disc 5 at diametrically opposite points, two flat spring ears 13, 13. As shown in Figure 5, each of these ears is bent to project outwardly between the opposed portions of the iron 1 and lid 3, and then upwardly to yieldingly engage the periphery of the lid to hold it in contact with the iron 1.

Formed in the upper portions of the ears 13, 13 are vertical slots 14 to receive, when the ears are sprung outwardly, pins 15 that project outwardly from the lid 3. These pins 15 when the lid is in its closing position, are at the bottom of the slots 14, so that when the lid is first raised after the waffle is baked, the pins will travel to the tops of the slots, after which, when the lid is further raised, they will elevate the disc sufficiently to raise the baked waffle which it carries above the tops of the impression elements 2. This position of the waffle permits a knife or fork to be inserted between it and the disc in such a manner as to remove the waffle intact, whereas, under the present method, it is necessary to get the knife beneath the waffle below the plane of the tops of the impression elements 2, which operation results in breaking the waffle in most instances before it is removed.

By springing the ears 13 beyond the pins 15, the lid 3 can be turned back to the position shown in Figure 1 while another batch of batter is placed upon the disc 5 in the iron 1.

I do not wish to be limited to the details of construction and arrangement herein shown and described, and any changes or modifications may be made therein within the scope of the subjoined claims.

Having described my invention, I claim:

1. A cooking utensil comprising a baking iron formed on its bottom with impression elements, a lid hingedly secured to said iron, a flat batter receiving member having holes through which the impression elements of said iron project, and means connected between said member and lid to raise the cake above said elements after it has been baked upon said member, for the purpose specified.

2. A cooking utensil comprising a waffle iron formed on its bottom with impression elements, a lid hingedly secured to said iron, a batter receiving disc having holes through which said impression elements project, and a loose connection between said lid and disc, whereby, after the lid is raised a short distance, it will, when elevated further, pull the disc carrying the baked waffle above said impression elements on the iron for the purpose specified.

3. A cooking utensil comprising a waffle iron formed on its bottom with impression elements, a lid hingedly secured to said iron, a batter receiving disc having holes through which said impression elements project, upwardly projecting spring ears on said disc formed with vertical slots, and lateral pins on said lid projecting into said slots to raise the disc carrying the baked waffle above said impression elements on the iron for the purpose specified.

In witness whereof I have hereunto set my hand this 25th day of June, 1926.

GEORGE B. QUATMAN.